(12) United States Patent
Ding Yik Ming et al.

(10) Patent No.: US 10,869,550 B2
(45) Date of Patent: Dec. 22, 2020

(54) MOBILE OFFICE STORAGE ASSEMBLY

(71) Applicant: AMQ Solutions, LLC, Santa Clara, CA (US)

(72) Inventors: Dennis Ding Yik Ming, Selangor (MY); Kin Fui Chong, Singapore (SG); Jiwon Shin, Seoul (KR); Bin Zhang, Foshan (CN)

(73) Assignee: AMQ SOLUTIONS, LLC, Santa Clara, CA (US)

( * ) Notice: Subject to any disclaimer, the term of this patent is extended or adjusted under 35 U.S.C. 154(b) by 0 days.

(21) Appl. No.: 16/409,447

(22) Filed: May 10, 2019

(65) Prior Publication Data

US 2020/0352323 A1    Nov. 12, 2020

Related U.S. Application Data

(63) Continuation-in-part of application No. 29/690,831, filed on May 10, 2019.

(51) Int. Cl.
| | |
|---|---|
| *A47B 46/00* | (2006.01) |
| *A47C 7/62* | (2006.01) |
| *A47C 7/02* | (2006.01) |
| *A47B 63/00* | (2006.01) |
| *F16B 1/00* | (2006.01) |
| *A47C 7/00* | (2006.01) |

(52) U.S. Cl.
CPC .............. *A47B 46/00* (2013.01); *A47C 7/021* (2013.01); *A47C 7/626* (2018.08); *A47B 63/00* (2013.01); *A47C 7/006* (2013.01); *F16B 1/00* (2013.01); *F16B 2001/0035* (2013.01)

(58) Field of Classification Search
CPC ................................ A47B 46/00; A47B 63/00
See application file for complete search history.

(56) References Cited

U.S. PATENT DOCUMENTS

| | | | |
|---|---|---|---|
| 759,667 | A | 5/1904 | Canberg |
| 791,112 | A | 5/1905 | Rothwell |
| 1,326,809 | A | 12/1919 | Twiss |
| 1,413,595 | A | 4/1922 | Kreuzkamp |
| 2,247,720 | A | 7/1941 | Wonderly |
| D151,983 | S | 12/1948 | Guertin |
| 2,567,986 | A | 9/1951 | Barrett |
| 2,667,658 | A | 2/1954 | Cornick |
| 2,798,732 | A | 7/1957 | Craig |

(Continued)

FOREIGN PATENT DOCUMENTS

FR          2905297 A3       3/2008

*Primary Examiner* — Brian L Swenson
(74) *Attorney, Agent, or Firm* — Price Heneveld LLP (57) ABSTRACT

A mobile office storage assembly includes a housing including a top wall, a lower-most bottom wall and a pair of sidewalls that cooperate to define an interior storage space, a first horizontal surface movable between a retracted position where a majority of the first horizontal surface is positioned below the bottom wall and an extended position where the first horizontal surface is positioned outwardly with respect to the retracted position, and a second horizontal surface movable between a retracted position where a majority of the second horizontal surface is positioned below the bottom wall and an extended position where the second horizontal surface is positioned outwardly with respect to the retracted position of the second horizontal work surface.

24 Claims, 5 Drawing Sheets

(56) References Cited

U.S. PATENT DOCUMENTS

| | | | |
|---|---|---|---|
| 2,979,242 A | 4/1961 | Van Huis et al. | |
| 3,092,428 A | 6/1963 | Kerschner | |
| 3,353,865 A | 11/1967 | Bass | |
| 4,318,575 A | 3/1982 | Redlich | |
| 4,491,375 A | 1/1985 | Ugalde | |
| 4,822,116 A | 4/1989 | Relyea et al. | |
| 4,861,122 A | 8/1989 | Newhouse et al. | |
| 4,915,248 A | 4/1990 | Chap | |
| 4,958,891 A | 9/1990 | Taylor et al. | |
| 5,150,760 A | 9/1992 | Johnson | |
| D351,508 S | 10/1994 | Bonazza | |
| 5,599,078 A | 2/1997 | Dechene et al. | |
| 5,803,562 A * | 9/1998 | Jacobs | A47B 21/00 312/223.3 |
| 5,829,859 A | 11/1998 | Cram | |
| D415,359 S | 10/1999 | Boyd | |
| 6,024,427 A | 2/2000 | Underwood et al. | |
| 6,206,495 B1 | 3/2001 | Peterson | |
| 6,209,977 B1 * | 4/2001 | Vondrejs | A47B 85/08 312/249.9 |
| 6,398,323 B1 | 6/2002 | Lee | |
| 6,474,665 B1 | 11/2002 | Fink et al. | |
| 6,688,615 B2 | 2/2004 | Chen | |
| 6,692,011 B2 | 2/2004 | Carlson et al. | |
| 6,860,494 B1 | 3/2005 | Chisholm | |
| 6,953,199 B2 | 10/2005 | Malloy, III | |
| 7,338,054 B2 | 3/2008 | Pint | |
| 7,574,758 B2 | 8/2009 | Arason et al. | |
| 7,862,341 B2 | 1/2011 | Durand et al. | |
| 7,909,421 B2 * | 3/2011 | Nielsen | A47B 81/062 312/205 |
| 8,146,722 B1 | 4/2012 | Moreno et al. | |
| D667,602 S | 9/2012 | Salmon | |
| 8,322,732 B2 | 12/2012 | McKay et al. | |
| 8,480,191 B1 | 7/2013 | Fredricks et al. | |
| 8,544,860 B2 | 10/2013 | Fan | |
| 8,616,663 B2 | 12/2013 | Ton | |
| 8,651,591 B1 | 2/2014 | Chen et al. | |
| 8,915,504 B1 | 12/2014 | Seibert | |
| 8,936,326 B2 | 1/2015 | Fulterer | |
| 9,038,216 B2 | 5/2015 | Buege et al. | |
| 9,079,596 B2 | 7/2015 | Sofy et al. | |
| D753,409 S | 4/2016 | Gaschy et al. | |
| 9,301,608 B2 | 4/2016 | Lee et al. | |
| D796,872 S | 9/2017 | Sienkowski et al. | |
| 10,492,582 B2 * | 12/2019 | Miles | A45C 5/146 |
| 2002/0060439 A1 * | 5/2002 | Carlson | B62B 5/06 280/79.11 |
| 2002/0130598 A1 * | 9/2002 | Schmidt | A47B 46/00 312/324 |
| 2004/0100173 A1 * | 5/2004 | Jakob-Bamberg | A47B 88/42 312/330.1 |
| 2007/0210685 A1 | 9/2007 | Paquette et al. | |
| 2007/0283854 A1 | 12/2007 | Taylor | |
| 2008/0217130 A1 | 9/2008 | Louis | |
| 2009/0127989 A1 | 5/2009 | Liuhong et al. | |
| 2011/0068562 A1 | 3/2011 | Keffeler et al. | |
| 2014/0190780 A1 | 7/2014 | Blazure | |
| 2016/0345731 A1 * | 12/2016 | Youngs | A47B 88/42 |
| 2017/0015228 A1 * | 1/2017 | Berno | B60N 3/001 |

\* cited by examiner

MOBILE OFFICE STORAGE ASSEMBLY

CROSS-REFERENCE TO RELATED APPLICATIONS

This application is a continuation-in-part of U.S. Design patent application Ser. No. 29/690,831, filed on May 10, 2019, entitled "MOBILE STORAGE ARRANGEMENT," the entire disclosures of which are incorporated herein by reference.

BACKGROUND OF THE INVENTION

The embodiments of the disclosure included herein relate to a mobile office storage assembly, and in particular to a mobile office storage assembly configured to provide an interior storage space and one or more auxiliary storage spaces, thereby maximizing use of a limited office floor space.

SUMMARY OF THE INVENTION

According to one aspect of the present disclosure, a mobile office storage assembly includes a housing including a top wall, a lower-most bottom wall and a pair of sidewalls that cooperate to define an interior storage space, a first horizontal surface movable between a retracted position where a majority of the first horizontal surface is positioned below the bottom wall and an extended position where the first horizontal surface is positioned outwardly with respect to the retracted position, and a second horizontal surface movable between a retracted position where a majority of the second horizontal surface is positioned below the bottom wall and an extended position where the second horizontal surface is positioned outwardly with respect to the retracted position of the second horizontal work surface.

According to another aspect of the present disclosure, a mobile office storage assembly includes a housing including a top wall, a bottom wall, a first sidewall and a second sidewall that cooperate to define an interior storage space, and an L-shaped first auxiliary storage member including a substantially horizontal first surface and a substantially vertical second surface extending upwardly from the first surface, the first auxiliary storage member movable between a retracted position where the second surface is located proximate the first sidewall and an extended position where the second surface is located further from the first sidewall than when in the retracted position thereby defining a first storage space between the first sidewall and the second surface that is separate from the interior storage space of the housing.

According to yet another aspect of the present disclosure, a mobile office storage assembly includes a housing including a top wall, a bottom wall and a pair of sidewalls that cooperate to define an interior storage space, a pair of storage members each movable with respect to the housing between a first position where a storage space of the storage member is substantially inaccessible and a second position where the storage space of the storage member is accessible to receive an item to be stored within the storage space of the storage member, at least one main castor coupled to the housing and configured to support the housing above a floor surface, and a first auxiliary castor coupled to one of the storage members and a second auxiliary castor coupled to the other of the storage members, where each of the auxiliary castors is configured to support the respective storage member above the floor surface.

The principal objects of the embodiments as disclosed herein are to provide a mobile office storage assembly that provides an interior storage space as well as one or more auxiliary storage members that provide additional storage space for temporarily storing personal items or office supplies, thereby maximizing use of limited office floor space. The embodiments of the mobile office storage assembly as disclosed herein efficiently make use of limited floor space, are capable of a long operating life, are highly mobile and adaptive to changing office layouts and environments, and are particularly well adapted for the proposed use.

These and other features, advantages, and objects of the embodiments disclosed will be further understood and appreciated by those skilled in the art by reference to the following specification, claims, and appended drawings.

DETAILED DESCRIPTION OF THE PREFERRED EMBODIMENTS

Figure 1:
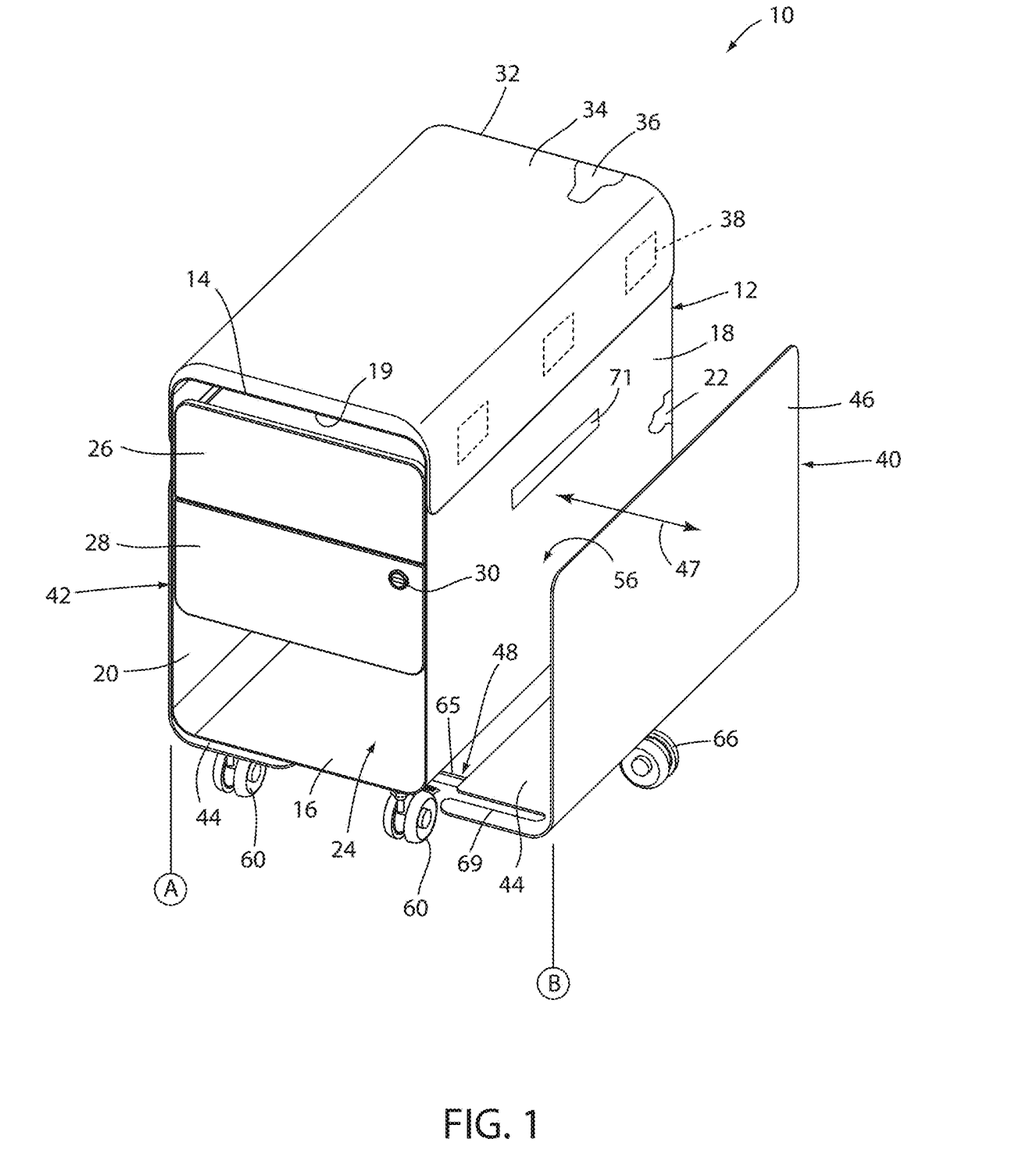
FIG. 1 is a perspective view of an embodiment of a mobile office storage assembly.

For purposes of description herein, the terms "upper," "lower," "right," "left," "rear," "front," "vertical," "horizontal," and derivatives thereof shall relate to the invention as oriented in FIG. 1. However, it is to be understood that the mobile office storage assembly may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other characteristics relating to the embodiments disclosed herein are not to be considered as limiting, unless the claims expressly state otherwise.

Figure 2:
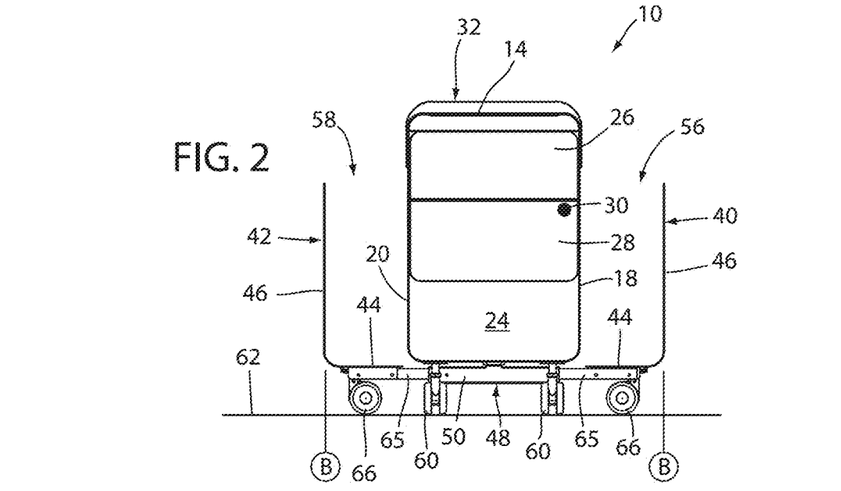
FIG. 2 is a front elevational view of the storage assembly including auxiliary storage members in an extended position.
Figure 3:
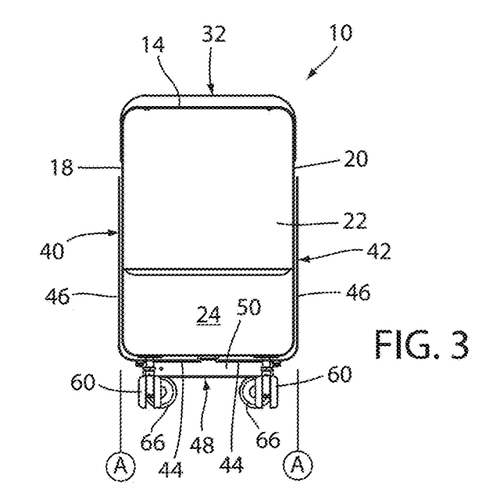
FIG. 3 is a rear elevational view of the storage assembly with the auxiliary storage members in a retracted position.
Figure 4:
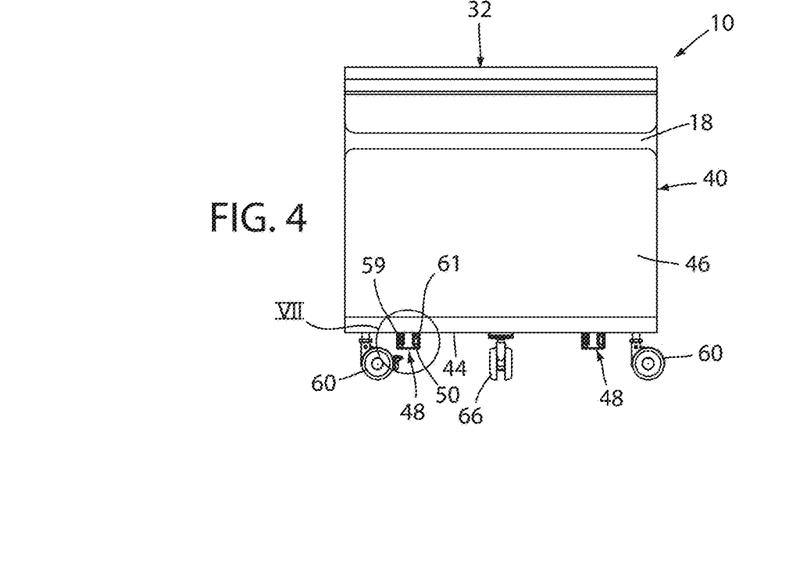
FIG. 4 is a side elevational view of the storage assembly.
Figure 6A:
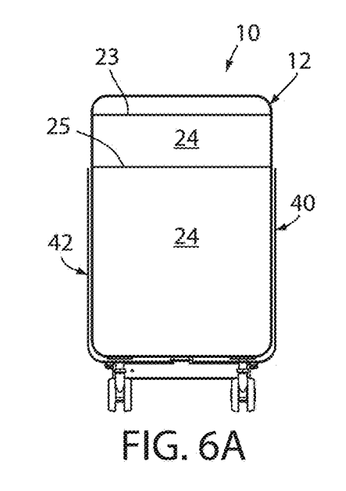
FIGS. 6A-6H are front and rear elevational views of the storage assembly with alternatively configured drawer and door arrangements.
Figure 6B:
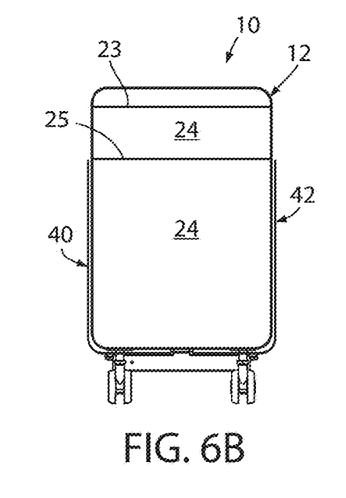
Figure 6C:
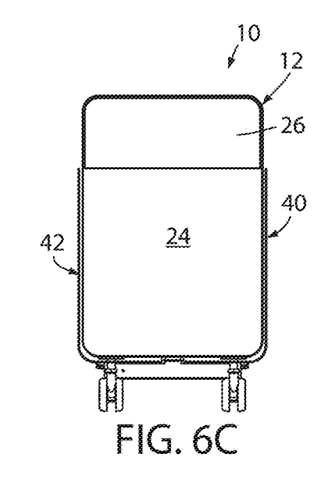
Figure 6D:
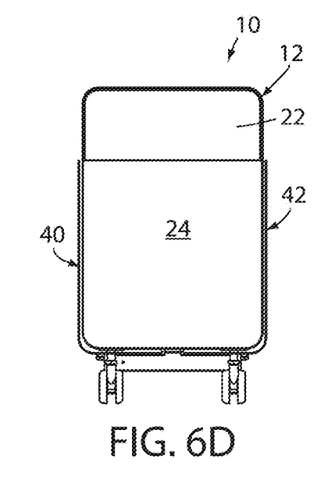
Figure 6E:
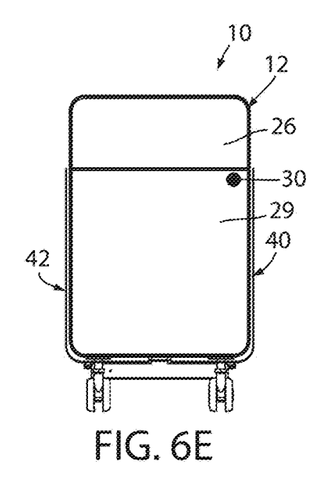
Figure 6F:
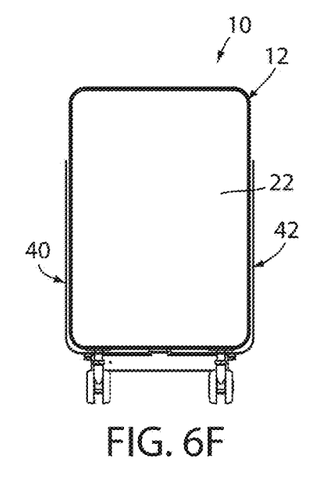
Figure 6G:
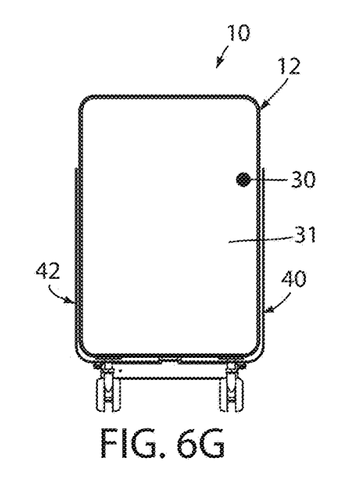
Figure 6H:
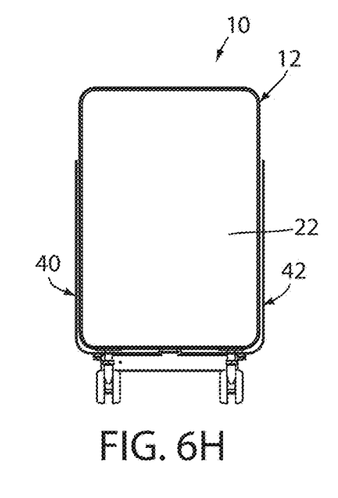
Figure 7:
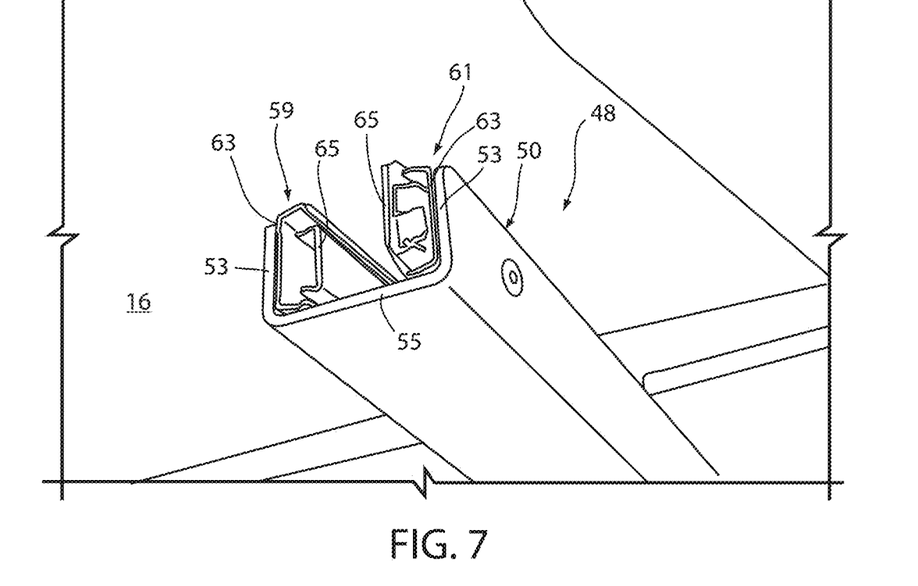
FIG. 7 is an enlarged perspective view of area VII, FIG. 4.

The reference numeral 10 (FIGS. 1-4) generally designates an embodiment of a mobile office storage assembly. In the illustrated example, the storage assembly 10 includes a housing 12 that includes an upper most top wall 14, a lower most bottom wall 16, a first sidewall 18, a second sidewall 20 opposite the first sidewall 18, and a rear wall 22, wherein the top wall 14, the bottom wall 16, the sidewalls 18, 20 and the rear wall 22 cooperate to define an interior storage space 24. The rear wall 22 may extend completely between the top wall 14 and the bottom wall 16, or may extend partially between the top wall 14 and the bottom wall 16 thereby providing access to the interior space 24 from both the front and back of the storage assembly 10, as best illustrated in FIGS. 2 and 3. The lower portion of the interior storage space 24 of the embodiment of the storage assembly 10 illustrated in FIGS. 2 and 3 is configured to receive and store personal items such as shoes, boots, bags or packages therein. The interior storage space 24 of the storage assembly 10 may be subdivided by laterally-extending structural supports 23 and/or intermediate interior walls or shelves 25 (FIGS. 6A and 6B), or may also be configured to receive and subdivided by variously sized drawers, such as an upper drawer 26 (FIGS. 1 and 6C-6F) and a lower drawer 28 (FIGS. 1-3) each movable between an extended and a retracted position, a relatively larger file drawer 29 (FIGS. 6E and 6F), or utility drawers such as pencil trays and office supply holders (not shown). The interior storage space 24 may be closed and rendered inaccessible via a pivoting door 31 (FIGS. 6G and 6H) or sliding door (not shown). Each of the drawers and/or doors as discussed above may include a lock assembly 30.

The storage assembly 10 may also include a cushion member 32 positioned over the top wall 14 and extending partially down each of the sidewalls 18, 20. In the illustrated example, the cushion member 32 includes a fabric cover 34 covering a compressible foam core 36, and is held in position via a plurality of magnets 38 secured to the cushion member 32 and magnetically coupled to the sidewalls 18, 20 and/or top wall 14 of the housing 12. The cushion member 32 may also include an anti-slip covering 19 on a bottom surface thereof.

Figure 8:
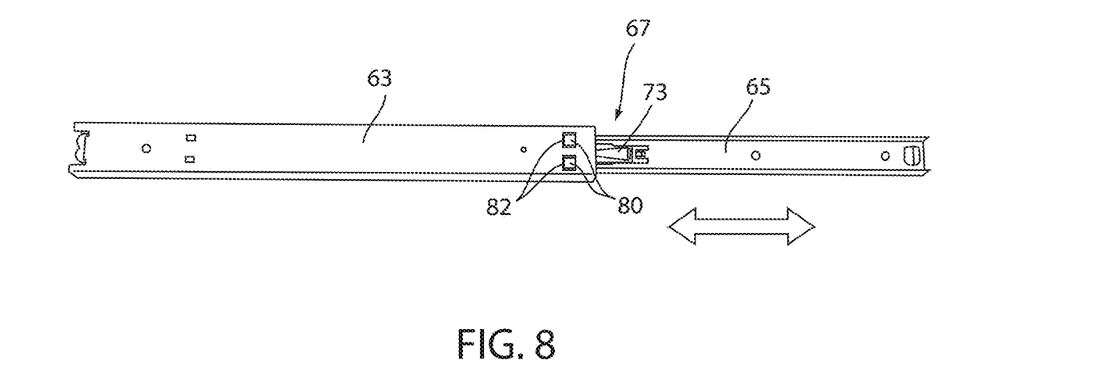
FIG. 8 is a bottom plan view of a drawer slide assembly.
Figures 9, 10:
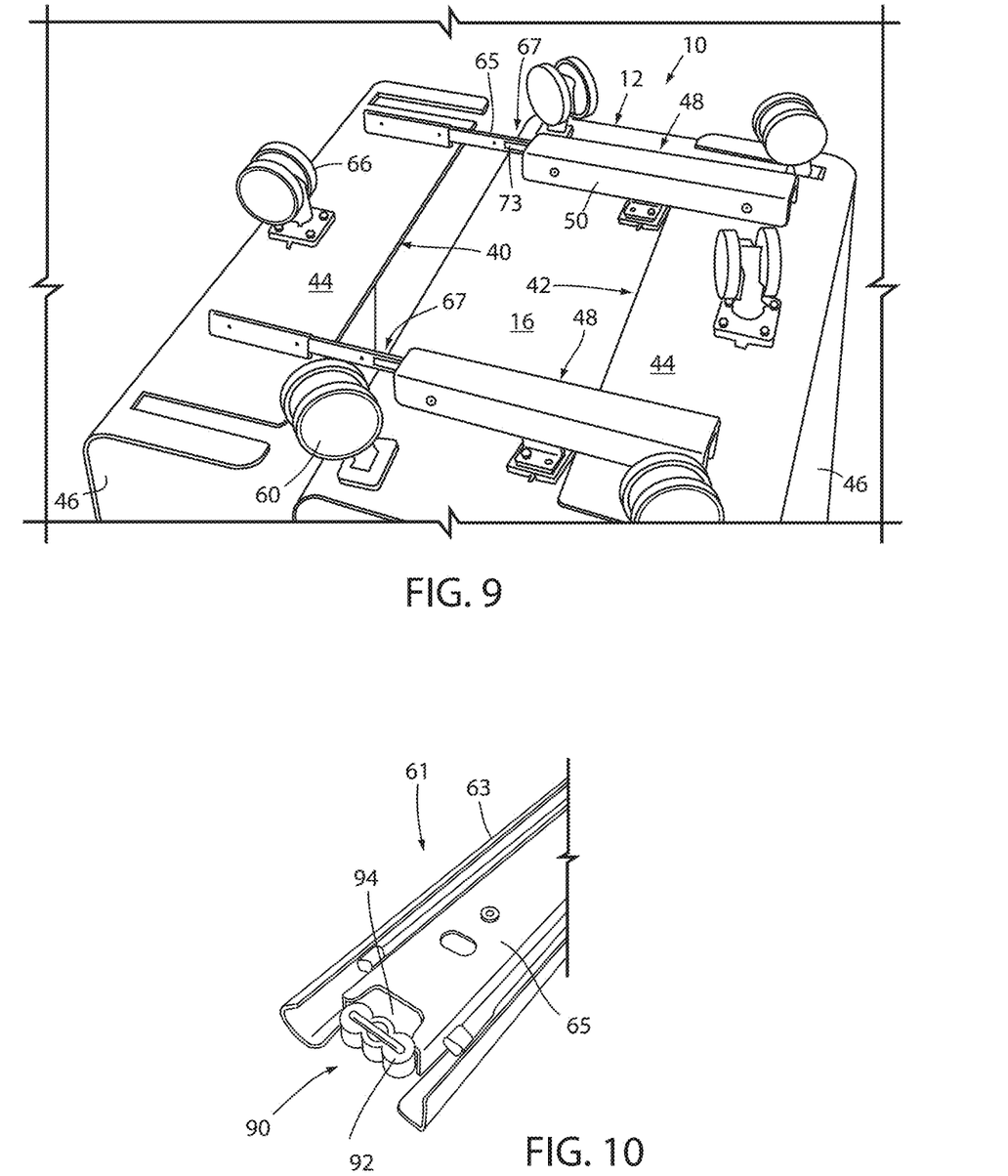
FIG. 9 is a bottom perspective view of the mobile office storage assembly.
FIG. 10 is an enlarged, partial perspective view of the drawer slide assembly.

The storage assembly 10 further includes a first auxiliary storage member or auxiliary surface member 40 and a second auxiliary storage member or auxiliary surface member 42 each movable in the directions 47 between a fully retracted position A and a fully extended position B. Each auxiliary storage member 40, 42 includes a horizontal surface 44 and a vertical surface 46 extending upwardly from a distal end of the horizontal surface 44 such that the horizontal surface 44 and the vertical surface 46 cooperate to define a substantially L-shaped cross-sectional configuration. In the illustrated example, each auxiliary storage member 40, 42 is supported from the bottom wall of the housing 12 by a pair of slide arrangements 48. Each slide arrangement 48 includes a slide support bracket 50 (FIGS. 2, 4, 5 and 7) fixedly secured to the bottom wall 16 of the housing 12 in a lateral direction, where each slide support bracket 50 includes a pair of side walls 53 extending downwardly from the bottom wall 16, and a lower wall 55 extending between distal ends of the side walls 53. Each slide arrangement 48 also includes a first slide assembly 59 configured to support the first auxiliary storage member 40 and a second slide assembly 61 configured to support the second auxiliary storage member 42. The first and second slide assemblies 59, 61 (FIG. 8) each include a housing bracket 63 fixed to one of the side walls 53 of the slide support bracket 50, and a storage member bracket 65 fixed to the horizontal surface 44 of the associated auxiliary storage member 40, 42 and slidably engaging the housing bracket 63, such that the storage member bracket 65 may be telescopingly extended from the slide support bracket 50. In the illustrated example, the housing brackets 63 that support that first auxiliary storage member 40 and the second auxiliary storage member 42 are fixed to opposite side walls 53 of the slider support bracket 50 so that each slide assembly 59, 61 may extend the full length of the slide support brackets 53 without interference between the slide assemblies 59, 61. In the illustrated example, the auxiliary storage members 40, 42 are each movable between the retracted position A where a majority of the horizontal surface 44 of each of the auxiliary storage members 40, 42 is positioned below the bottom wall 16 of the housing 12 and the vertical surface 46 of the auxiliary storage members 40, 42 are positioned proximate the sidewalls 18, 20, respectively, and an extended position B where the horizontal surface 44 of each of the auxiliary storage members 40, 42 are positioned outwardly from or with respect to the retracted position A and the vertical surface 46 of each of the auxiliary storage members 40, 42 are spaced from the respective sidewalls 18, 20, thereby defining and allowing access to a first auxiliary storage space 56 and a second auxiliary storage space 58 defined by the first sidewall 18 and the horizontal surface 44 and vertical surface 46 of the first auxiliary storage member 40, and by the second sidewall 20 and the horizontal surface 44 and vertical surface 46 of the second auxiliary storage member 42, respectively. In the illustrated example, the auxiliary storage spaces 56, 58 are sized so as to easily house personal items, such as backpacks, briefcases, shoulder bags and the like as well as various office supplies.

The slide arrangements 48 may also be configured to retain the first and second auxiliary storage members 40, 42 in the fully retracted position A to inhibit accidental or inadvertent movement of the auxiliary storage member 40, 42 from the retracted position A toward the extended position B during use or movement of the storage assembly 10, and/or in the fully extended position B to inhibit accidental or inadvertent retraction of the auxiliary storage member 40, 42 from the extended position B toward the retracted position A during use or movement of the storage assembly. Specifically, the slide arrangements 48 may include one or more detent arrangements configured such that an additional force is required to begin initial movement of the auxiliary storage members 40, 42 from the fully retracted and extended positions A, B than is required to move the auxiliary storage members 40, 42 along a majority of travel thereof. As best illustrated in FIGS. 7-10, each drawer slide assembly 59, 61 may include a detent and release assembly 67 that includes a catch member 73 fixed along the length of the storage member bracket 65. The catch member 73 includes catch portions 80 biased toward engagement with corresponding apertures 82 within the housing bracket 63 when aligned therewith. During operation, an operator moves the storage member 40, 42 from the fully extended position B toward the retracted position A by exerting a force sufficient to overcome the biasing force of the catch portions 80 within the apertures 82, with the force required to move the storage member 40, 42 toward the retracted position being reduced once the catch portion 80 exits the aperture 82. The detent and release assembly 67 is also configured to allow the operator to remove the storage member 40, 42 from the overall mobile office storage assembly 10. In the illustrated example, the catch portions 80 are accessible to and moveable by an operator between a first position where the catch portions 80 of the catch member 73 biasingly engage the apertures 82 in the associated storage member bracket 65 to a second position where the catch portions 80 of the catch member 73 are disengaged from the apertures 82, thereby allowing the storage member bracket 65 to slidably outwardly disengage from the housing bracket 63. In assembly, an operator aligns the storage member brackets 65 of the auxiliary storage member 40, 42 with the corresponding housing brackets 63 and slidably engages the storage member brackets 65 with the housing brackets 63 until the catch portions 80 of the catch member 73 of each storage member bracket 65 engages the apertures 82 of the housing brackets 63. Each drawer slide assembly 59, 61 may also include a bumper assembly 90 (FIG. 10) that includes a plurality of elastically compressible bumpers 92 fixed with respect to the housing bracket 63. In the illustrated example, the storage member brackets 65 each have a width at a location 94 configured to receive the bumpers 92 therein and collapse the bumpers 92 when the storage member 40, 42 is in a fully retracted position as the storage member bracket 65 has a width at location 94 that is slightly less than the combined overall width of the bumpers 92 when in a non-compressed state. During operation, an operator moves the storage member 40, 42 from the fully retracted position A toward the extended position B by exerting a force sufficient to overcome the biasing force of the bumpers 92 within the end of the storage member bracket 65, with the force required to move the storage member 42, 44 toward the extended position being reduced once the bumpers 92 exit the end of the storage member bracket 65.

As best illustrated in FIG. 1, the sidewalls 18, 20 may each be provided with a relief 71 extending into the respective sidewall 18, 20 and configured so as to allow an operator to more easily grasp or access an upper edge of the vertical surface 46 of each of the auxiliary storage members 40, 42 to move the auxiliary storage members 40, 42 from the retracted position A to the extended position B.

Figure 5:
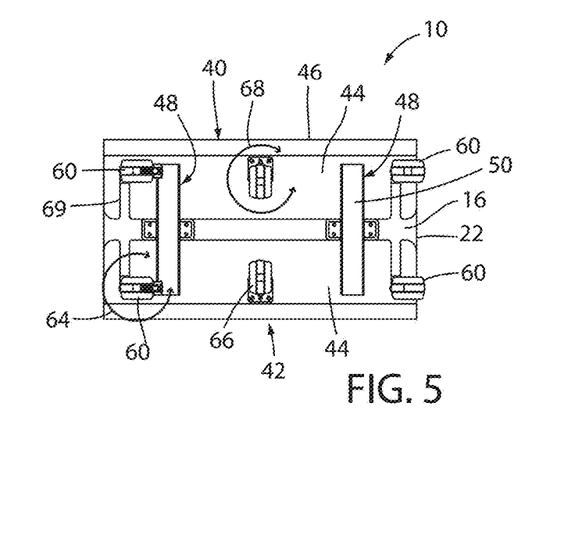
FIG. 5 is a bottom plan view of the storage assembly.

The storage assembly 10 further includes a plurality of main or housing castors spaced about and secured to the bottom wall 16 of the housing 12, where the main castors 60 are configured to support the housing 12 above a floor surface 62. The main castors 60 may each be pivotable 360° in the directions 64 so as to allow easy manipulation and movement of the storage assembly 10 across the floor surface 62. As best illustrated in FIGS. 1 and 5, the horizontal surface 44 of each of the auxiliary storage members 40, 42 may include slots 69 configured to receive the main castors 60 therein as the auxiliary storage members 40, 42 are moved between the retracted and extended positions A, B.

The storage assembly 10 may also include auxiliary castors 66 secured to the auxiliary storage members 40, 42, and specifically to the horizontal surface 44 of each of the auxiliary storage members 40, 42, thereby supporting the auxiliary storage members 40, 42 above the floor surface 62 and providing sufficient support of the auxiliary storage members 40, 42 when in both the retracted position A and the extended or cantilevered position B. Each auxiliary castor 66 may be pivotable 360° in the directions 68 so as to allow easy manipulation of the overall storage assembly 10 about the floor surface 62, and the auxiliary storage members 40, 42 when moving the auxiliary storage members 40, 42 between the retracted and extended positions A, B.

The mobile office storage assembly disclosed herein provides an interior storage space as well as one or more auxiliary storage members that provide additional storage space for temporarily storing personal items or office supplies, thereby maximizing use of limited office floor space. The embodiments of the mobile office storage assembly as disclosed herein efficiently make use of limited floor space, are capable of a long operating life, are highly mobile and adaptive to changing office layouts and environments, and are particularly well adapted for the proposed use.

In the foregoing description, it will be readily appreciated by those skilled in the art that modifications may be made to the embodiments as disclosed herein without departing from the concepts as disclosed herein. Such modifications are to be considered as included in the following claims, unless these claims by the language expressly state otherwise.

The invention claimed is:

1. A mobile office storage assembly, comprising:
a housing including a top wall, a lower-most bottom wall and a pair of sidewalls that cooperate to define an interior storage space;
a first horizontal surface movable between a retracted position where a majority of the first horizontal surface is positioned below the bottom wall and an extended position where the first horizontal surface is positioned outwardly with respect to the retracted position; and
a second horizontal surface movable between a retracted position where a majority of the second horizontal surface is positioned below the bottom wall and an extended position where the second horizontal surface is positioned outwardly with respect to the retracted position of the second horizontal work surface, wherein the second horizontal surface may be moved separately from the first horizontal surface.

2. The mobile office storage assembly of claim 1, further comprising:
at least one main castor coupled to the bottom wall and configured to support the housing above a floor surface.

3. The mobile office storage assembly of claim 2, further comprising:
at least one auxiliary castor operably coupled to at least one of the first and second horizontal surfaces and configured to support the at least one of the first and second horizontal surfaces above the floor surface.

4. The mobile office storage assembly of claim 3, wherein the at least one auxiliary castor includes a first auxiliary castor coupled to the first horizontal surface and configured to support the first horizontal surface above the floor surface, and a second auxiliary castor coupled to the second horizontal surface and configured to support the second horizontal surface above the floor surface.

5. The mobile office storage assembly of claim 1, further comprising:
a first auxiliary surface member that includes the first horizontal surface and a first vertical surface that extends upward from the first horizontal surface and is movable therewith.

6. The mobile office storage assembly of claim 5, further comprising:
a second auxiliary surface member that includes the second horizontal surface and a second vertical surface that extends upward from the second horizontal surface and is movable therewith.

7. The mobile office storage assembly of claim 1, wherein the first horizontal surface is slidable between the retracted and extended positions.

8. The mobile office storage assembly of claim 1, wherein the first and second horizontal surfaces are located on opposite sides of the housing from one another.

9. The mobile office storage assembly of claim 1, further comprising:
a cushion member at least partially covering the top wall of the housing.

10. The mobile office storage assembly of claim 9, wherein the cushion member is secured to the housing via one or more magnets.

11. A mobile office storage assembly, comprising:
a housing including a top wall, a lower-most bottom wall and a pair of sidewalls that cooperate to define an interior storage space;
a first horizontal surface movable between a retracted position where a majority of the first horizontal surface is positioned below the bottom wall and an extended position where the first horizontal surface is positioned outwardly with respect to the retracted position; and
a second horizontal surface movable between a retracted position where a majority of the second horizontal surface is positioned below the bottom wall and an extended position where the second horizontal surface is positioned outwardly with respect to the retracted position of the second horizontal work surface;
wherein a greater force is required to move the first horizontal surface from at least one of the retracted and extended positions toward the other of the extended and retracted positions than is required to move the first horizontal surface between a majority of travel between the retracted and extended positions.

12. A mobile office storage assembly, comprising:
a housing including a top wall, a bottom wall, a first sidewall and a second sidewall that cooperate to define an interior storage space; and
a first auxiliary storage member including a substantially horizontal first surface and a substantially vertical second surface extending upwardly from the first surface, the first auxiliary storage member movable between a retracted position where the second surface is located proximate the first sidewall and an extended position where the second surface is located further from the first sidewall than when in the retracted position such that the first sidewall and the second surface cooperate to define a first storage space therebetween that is separate from the interior storage space of the housing.

13. The mobile office storage assembly of claim 12, wherein the first surface and the second surface cooperate to define a substantially L-shaped cross-sectional configuration.

14. The mobile office storage assembly of claim 12, further comprising:
a second auxiliary storage member including a substantially horizontal first surface and a substantially vertical second surface extending upwardly from the first surface of the second auxiliary storage member, the second auxiliary storage member movable between a retracted position where the second surface of the second auxiliary storage member is located proximate the second sidewall and an extended position where the second surface of the second auxiliary storage member is located further from the second sidewall than when in the retracted position such that the second sidewall and the second surface of the second auxiliary storage member cooperate to define a second storage space therebetween that is separate from the interior storage space of the housing.

15. The mobile office storage assembly of claim 12, further comprising:
at least one main castor coupled to the bottom wall and configured to support the housing above a floor surface.

16. The mobile office storage assembly of claim 12, wherein the first auxiliary storage member is slidable between the retracted and extended positions.

17. The mobile office storage assembly of claim 12, wherein a greater force is required to move the first auxiliary storage member from at least one of the retracted and extended positions toward the other of extended and retracted positions than is required to move the first auxiliary storage member between a majority of travel between the retracted and storage positions.

18. The mobile storage assembly of claim 12, wherein the first surface of the first auxiliary storage member is located closer to the bottom wall than the top wall.

19. The mobile storage assembly of claim 18, wherein a majority of the first surface of the first auxiliary storage member is located below the bottom wall when the first auxiliary storage member is in the retracted position.

20. A mobile office storage assembly, comprising:
a housing including a top wall, a bottom wall, a first sidewall and a second sidewall that cooperate to define an interior storage space; and
a first auxiliary storage member including a substantially horizontal first surface and a substantially vertical second surface extending upwardly from the first surface, the first auxiliary storage member movable between a retracted position where the second surface is located proximate the first sidewall and an extended position where the second surface is located further from the first sidewall than when in the retracted position thereby defining a first storage space between the first sidewall and the second surface that is separate from the interior storage space of the housing;
wherein the first and second auxiliary storage members are located on opposite sides of the housing from one another.

21. A mobile office storage assembly, comprising:
a housing including a top wall, a bottom wall and a pair of sidewalls that cooperate to define an interior storage space;
a pair of storage members each movable with respect to the housing between a first position where a storage space of the storage member is substantially inaccessible and a second position where the storage space of the storage member is accessible to receive an item to be stored within the storage space of the storage member;
at least one main castor coupled to the housing and configured to support the housing above a floor surface; and
a first auxiliary castor coupled to one of the storage members and a second auxiliary castor coupled to the other of the storage members, where each of the auxiliary castors is configured to support the respective auxiliary storage member above the floor surface.

22. The mobile storage assembly of claim 21, wherein each of the pair of storage members includes a substantially horizontal first surface and a substantially vertical second surface extending upwardly from the first surface, where the second surface is located proximate one of the sidewalls when in the first position and is located further from the one of the sidewalls when in the second position thereby defining the storage space of the storage member between the one of the sidewalls and the second surface.

23. The mobile office storage assembly of claim 21, wherein the first and second auxiliary storage members are each slidable between the first and second positions respectively.

24. The mobile office storage assembly of claim 21, wherein the first and second storage members are located on opposite sides of the housing from one another.

* * * * *

UNITED STATES PATENT AND TRADEMARK OFFICE
CERTIFICATE OF CORRECTION

PATENT NO. : 10,869,550 B2  
APPLICATION NO. : 16/409447  
DATED : December 22, 2020  
INVENTOR(S) : Ding Yik Mig et al.

Page 1 of 1

It is certified that error appears in the above-identified patent and that said Letters Patent is hereby corrected as shown below:

In the Specification

Column 1, Line 9:
"disclosures of which are" should be — disclosure of which is —

Column 3, Line 61:
"that" should be — the —

Column 3, Line 65:
"53" should be — 50 —

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*